United States Patent
Chang et al.

(10) Patent No.: US 6,369,525 B1
(45) Date of Patent: Apr. 9, 2002

(54) WHITE LIGHT-EMITTING-DIODE LAMP DRIVER BASED ON MULTIPLE OUTPUT CONVERTER WITH OUTPUT CURRENT MODE CONTROL

(75) Inventors: Chin Chang, Yorktown Heights; Subramanian Muthu, Tarrytown; Gert W. Bruning, Sleepy Hollow, all of NY (US)

(73) Assignee: Philips Electronics North America, New York, NY (US)

( * ) Notice: Subject to any disclaimer, the term of this patent is extended or adjusted under 35 U.S.C. 154(b) by 0 days.

(21) Appl. No.: 09/717,969

(22) Filed: Nov. 21, 2000

(51) Int. Cl.$^7$ ................................................ G05F 1/00
(52) U.S. Cl. ...................... 315/300; 315/302; 315/312; 315/362; 315/278; 363/17; 363/23; 362/800
(58) Field of Search .............................. 315/209 R, 276, 315/224, 278, 291, 297, 300, 302, 307, 312, 309, 362; 363/17, 21, 23, 126, 132; 362/800, 236

(56) References Cited

U.S. PATENT DOCUMENTS

| | | | | |
|---|---|---|---|---|
| 4,675,575 A | * | 6/1987 | Smith et al. ............. | 315/185 S |
| 5,659,237 A | * | 8/1997 | Divan et al. ................... | 320/6 |
| 5,661,645 A | * | 8/1997 | Hochstein ..................... | 363/89 |
| 5,828,558 A | * | 10/1998 | Korcharz et al. ............. | 363/20 |
| 5,920,466 A | * | 7/1999 | Hirahara ...................... | 363/21 |
| 6,016,038 A | * | 1/2000 | Meuller et al. ............. | 315/291 |
| 5,949,658 A | | 9/2000 | Thottuvelil et al. ........... | 363/15 |
| 6,149,283 A | * | 11/2000 | Conway et al. ............. | 362/236 |
| 6,285,140 B1 | * | 9/2001 | Ruxton ........................ | 315/312 |

FOREIGN PATENT DOCUMENTS

| | | |
|---|---|---|
| DE | 19732828 | 2/1999 |
| EP | 0939483 A2 | 9/1999 |

* cited by examiner

*Primary Examiner*—Haissa Philogene

(57) ABSTRACT

A white light-emitting-diode array driver circuit with a multiple output flyback (or forward) converter with output current mode control. The circuit comprises a power supply source and a transformer. The transformer has a primary winding coupled to, and configured to receive current from, the power supply, and a plurality of secondary windings coupled to the primary winding. The circuit also comprises a plurality of light-emitting-diode arrays, wherein each light-emitting-diode array is coupled to one of the secondary windings. A main controller is coupled to a first of the light-emitting-diode arrays and is configured to control a flow of current to the primary transformer winding. The circuit also comprises a plurality of secondary controllers, each of which are coupled to another of the light-emitting-diode arrays. In addition, each of the secondary controllers are configured to control a flow of current to its corresponding light-emitting-diode array. According to one embodiment of the invention, each of the light-emitting diodes has a resistor coupled to its cathode terminal. An output signal of each resistor is transmitted to the respective controller and is employed to determine the appropriate current flow to the light-emitting-diode array. The circuit may be configured as either a flyback converter, wherein the primary transformer winding is wound in the opposite direction of the secondary transformer windings, or as a forward converter, wherein the primary transformer winding is wound in the same direction as secondary transformer windings.

26 Claims, 5 Drawing Sheets

WHITE LIGHT-EMITTING-DIODE LAMP DRIVER BASED ON MULTIPLE OUTPUT CONVERTER WITH OUTPUT CURRENT MODE CONTROL

FIELD OF THE INVENTION

This invention relates generally to illumination systems, and more particularly to multi-color (red, green and blue, for example) light-emitting-diode driver circuitry that provides improved system efficiency and thermal performance, with reduced cost.

BACKGROUND OF THE INVENTION

A light-emitting diode is a type of semiconductor device, specifically a p-n junction, which emits electromagnetic radiation upon the introduction of current thereto. Typically, a light-emitting diode comprises a semiconducting material that is a suitably chosen compound, for example a gallium-arsenic-phosphorus compound. By varying the ratio of phosphorus to arsenic, the wavelength of the light emitted by a light-emitting diode can be adjusted, thereby providing light of different colors. By using different semiconductor materials (for example, AlInGaP and InGeN) and controlled "impurities", different color LED (such as red, green and blue) can be made.

With the advancement of semiconductor materials and optics technology, light-emitting diodes are increasingly being used for illumination purposes. For instance, high brightness light-emitting diodes are currently being used in automotive signals, traffics lights and signs, large area displays, etc.

Currently, electronic driver circuits that drive mono-color light-emitting-diode arrays typically employ a flyback converter. A flyback converter is used to drive an light-emitting-diode array lamp by converting an input line voltage (such as a 230 $V_{ac}$ input line) into a voltage source (such as a 30V voltage source). A linear regulator is then used to regulate the light-emitting-diode array current.

For systems that employ multiple color light-emitting-diode arrays, the electronic driver circuits that are currently used typically employ multiple power converters. For example, FIG. 1 illustrates a typical scheme for a driver circuit in which the light-emitting-diode arrays have three colors. Specifically, FIG. 1 shows system 10 having light-emitting-diode arrays that are red, blue and green, wherein each light-emitting-diode array employs a separate power converter.

For instance, red light-emitting-diode array 12 employs power converter 22, while green light-emitting-diode array 14 employs power converter 24 and blue light-emitting-diode array 16 employs power converter 26. The intensity of the light from each of the light-emitting-diode arrays is measured by photodetector 18, which transmits a signal corresponding to the intensity to control block 30. Control block 30 is configured to alternately turn the respective light-emitting-diode arrays on and off, so that the intensity of each may be measured independently. In addition, control block 30 transmits signals to power converters 22, 24 and 26, each of which employs the signal to control a flow of current through their respective light-emitting diode.

However, the redundancy of components for separate power converters for each light-emitting-diode array increases the size and cost of the driver circuit and reduces the efficiency of the circuit. Therefore, there exists a need for an improved light-emitting diode driver circuit that does not suffer from the problems of the prior art, as discussed above.

SUMMARY OF THE INVENTION

In accordance with one embodiment, the present invention relates to a white light LED driver circuit with multiple local feedback output current control circuits. The driver circuit comprises a power supply source and a transformer having a primary winding coupled to, and configured to receive current from, the power supply. The transformer also has a plurality of secondary windings coupled to the primary winding. The circuit also comprises a plurality of light-emitting-diode arrays, wherein each light-emitting-diode array is coupled to one of the secondary windings, in a local feedback control arrangement.

A main controller is coupled to a first of the light-emitting-diode arrays and is configured to control a flow of current to the primary transformer winding. The circuit also comprises a plurality of secondary controllers. Each of the secondary controllers is coupled to a corresponding light-emitting-diode array. In addition, each of the secondary controllers are configured to control a flow of current to its corresponding light-emitting-diode array.

According to one embodiment of the invention, each of the light-emitting diodes has a resistor coupled to its cathode terminal. An output signal of each resistor is transmitted to the respective controller and is employed to determine the appropriate current flow to the light-emitting-diode array. The driver circuit may be configured as either a flyback converter, wherein the primary transformer winding is wound in the opposite direction of the secondary transformer windings, or as a forward converter, wherein the primary transformer winding is wound in the same direction as secondary transformer windings.

BRIEF DESCRIPTION OF THE DRAWINGS

The present invention will be further understood from the following description with reference to the accompanying drawings, in which.

DETAILED DESCRIPTION OF THE INVENTION

Figure 1:
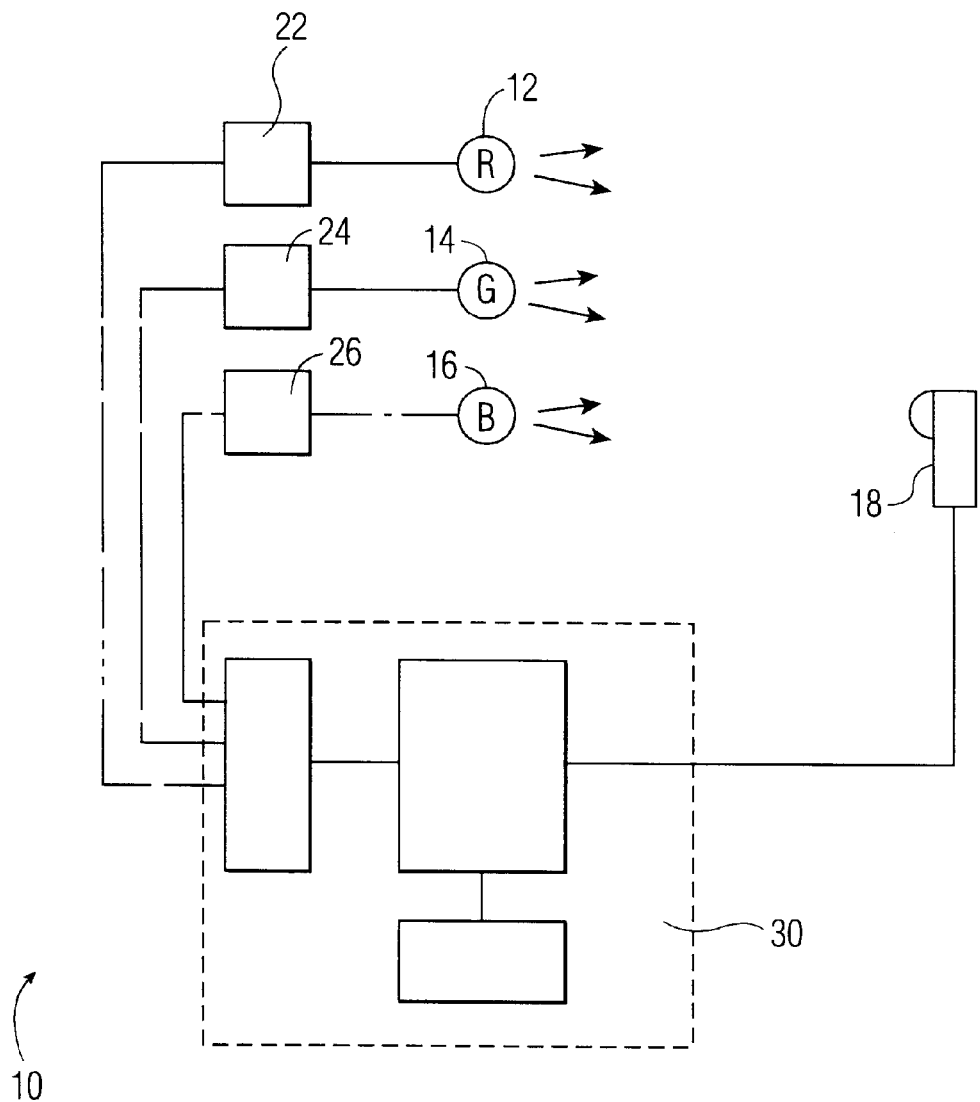
FIG. 1 illustrates a typical light-emitting-diode array driver circuit arrangement that employs multiple color light-emitting-diode arrays, as employed by a lighting system of the prior art.
Figure 2:
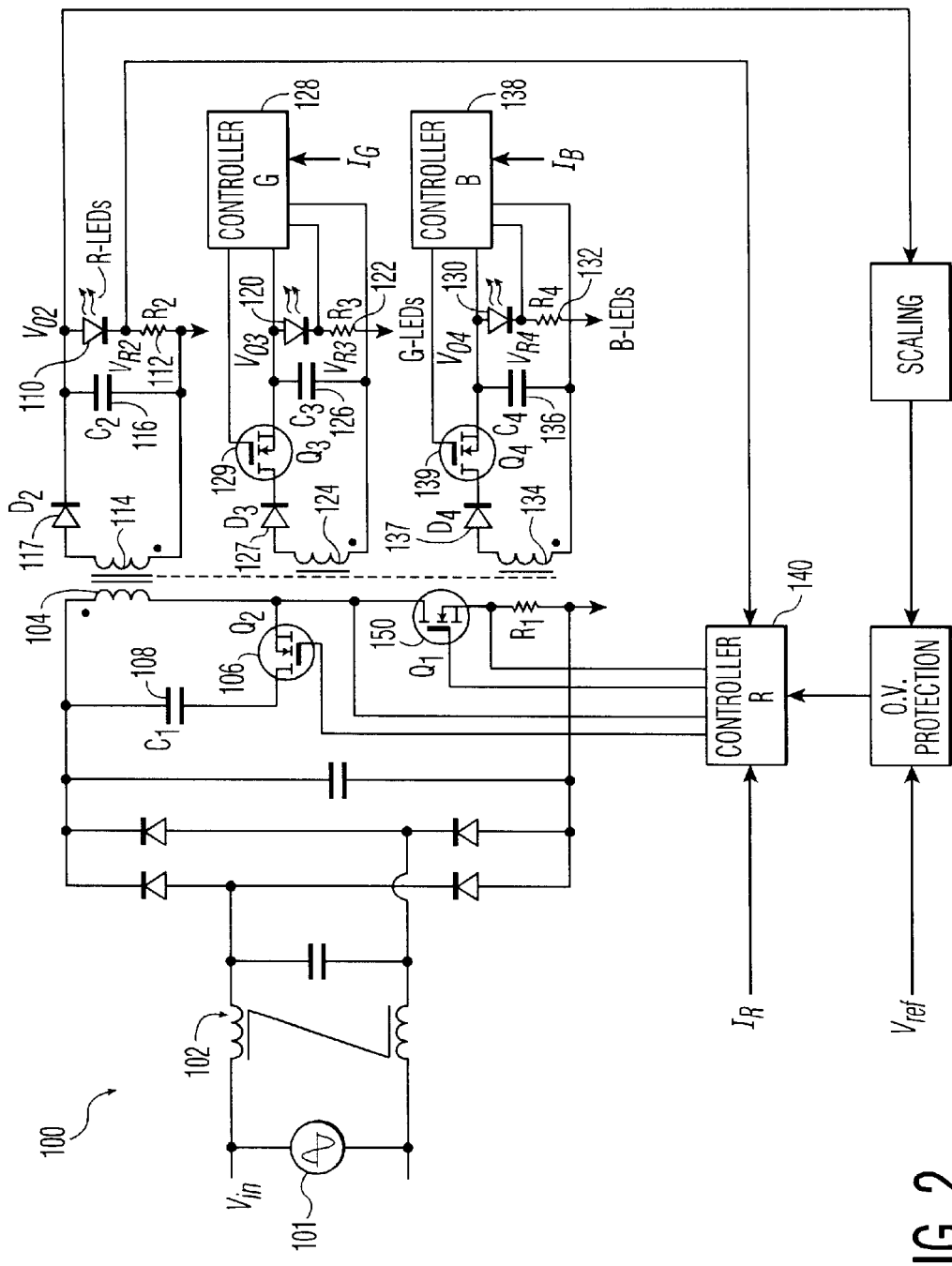
FIG. 2 illustrates an electronic light-emitting-diode array driver circuit, according to one embodiment of the present invention.

FIG. 2 illustrates an electronic light-emitting-diode array driver circuit, according to one embodiment of the present invention. Specifically, FIG. 2 illustrates white light-emitting-diode array driver circuit 100, which employs a multiple output flyback converter, as is discussed in more detail below. In addition, light-emitting-diode array driver circuit 100 employs an output current mode control, which is also discussed in greater detail below.

As illustrated in FIG. 2, voltage supply source 101 provides an input voltage signal, $V_{in}$, which is received at primary transformer winding 104. Disposed adjacent to and operating in conjunction with primary transformer winding 104 are secondary transformer windings 114, 124 and 134. As shown in the figure, primary transformer winding 104 is wound in an opposite direction to secondary transformer windings 114, 124 and 134, thus providing the flyback functionality.

Circuit driver 100 also comprises transistor 106 and capacitor 108. Transistor 106 and capacitor 108 provide an active clamping capability. Secondary transformer winding 114 provides a current signal to red light-emitting-diode array 110, which is coupled at opposite ends of secondary transformer winding 114. Coupled in parallel across secondary transformer winding 114 is capacitor 116. Coupled between secondary transformer winding 114 and capacitor 116 is diode 117.

The output current signal of red light-emitting-diode array 110 is sensed at resistor 112 and transmitted to main controller 140. Main controller 140 receives the current signal and employs the signal to control the flow of current to primary transformer winding 104. Transistor switch 150 is coupled to main controller 140 and is also employed to control the current through primary transformer winding 104.

As previously mentioned, secondary transformer winding 124 is also coupled to primary transformer winding 104, in order to operate in conjunction therewith. Secondary transformer winding 124 provides current to green light-emitting-diode array 120 which is coupled to opposite ends of winding 124. Coupled in parallel across secondary transformer winding 124 is capacitor 126. The output current signal of green light-emitting-diode array 120 is sensed at resistor 122 and transmitted to controller 128.

Coupled between secondary transformer winding 124 and capacitor 126 is diode 127 and transistor 129. Preferably, transistor 129 is an n-channel enhancement type MOSFET transistor. A first end of secondary transformer winding 124 is coupled directly to controller 128 while a second end is coupled to the anode terminal of diode 127. The cathode terminal of diode 127 is coupled to the drain terminal of transistor 129. The gate terminal of transistor 129 is coupled to controller 128. The source terminal of transistor 129 is coupled to controller 128, and also to the parallel branches comprising capacitor 126 and green light-emitting-diode array 120. By controlling the operation of transistor 129, controller 128 controls the current signal transmitted to green light-emitting-diode array 120.

Secondary transformer winding 134 is also coupled to primary transformer winding 104. Secondary transformer winding 134 provides a current signal to blue light-emitting-diode array 130, which is coupled at opposite ends of winding 134. Coupled in parallel across secondary transformer winding 134 and prior to blue light-emitting-diode array 130 is capacitor 136. The output current signal of blue light-emitting-diode array 130 is sensed at resistor 132 and transmitted to controller 138.

Coupled between secondary transformer winding 134 and capacitor 136 is diode 137 and transistor 139. As previously mentioned in connection with transistor 129, transistor 139 is preferably an n-channel enhancement type MOSFET transistor. A first end of secondary transformer winding 134 is coupled directly to controller 138 while a second end is coupled to the anode terminal of diode 137. The cathode terminal of diode 137 is coupled to the drain terminal of transistor 139. The gate terminal of transistor 139 is coupled to controller 138. The source terminal of transistor 139 is coupled to controller 138 and also to the parallel branches comprising capacitor 136 and blue light-emitting-diode array 130. By controlling the operation of transistor 139, controller 138 controls the current signal transmitted to blue light-emitting-diode array 130.

It is noted that, while the embodiment of the invention shown in FIG. 2 illustrates that main controller 140 is coupled to red light-emitting-diode array 110, the invention also contemplates that main controller 140 may be coupled to green light-emitting-diode array 120 or blue light-emitting-diode array 130. Specifically, according to another embodiment of the invention, driver circuit 100 is configured such that green light-emitting-diode array 120 is coupled to main controller 140 and red and blue light-emitting-diode arrays 110 and 130 are coupled to independent controllers such as controllers 128 and 138. In still another embodiment of the invention, driver circuit 100 is configured such that blue light-emitting-diode array 130 is coupled to main controller 140 and red and green light-emitting-diode arrays 110 and 120 are coupled to independent controllers such as controllers 128 and 138.

Regardless of which of the light-emitting-diode arrays are coupled to main controller 140, the employment of independent controllers such as controllers 128 and 138, which are coupled to the remaining light-emitting-diode arrays, enables the respective output currents of the light-emitting diodes to be independently controlled in a local feedback loop control arrangement. This is the case even though there exists some interaction between the output channels.

In comparison to the typical light-emitting-diode array driver circuits of the prior art, the multiple output flyback converter of the present invention has the advantage of reducing the redundancy of parts in the circuit. Specifically, whereas the typical light-emitting-diode array driver circuit of the prior art employs a separate converter for each color of light-emitting-diode array, the circuit of the present invention employs a single converter with multiple outputs, thereby reducing the size and cost of the circuit.

Figure 4:
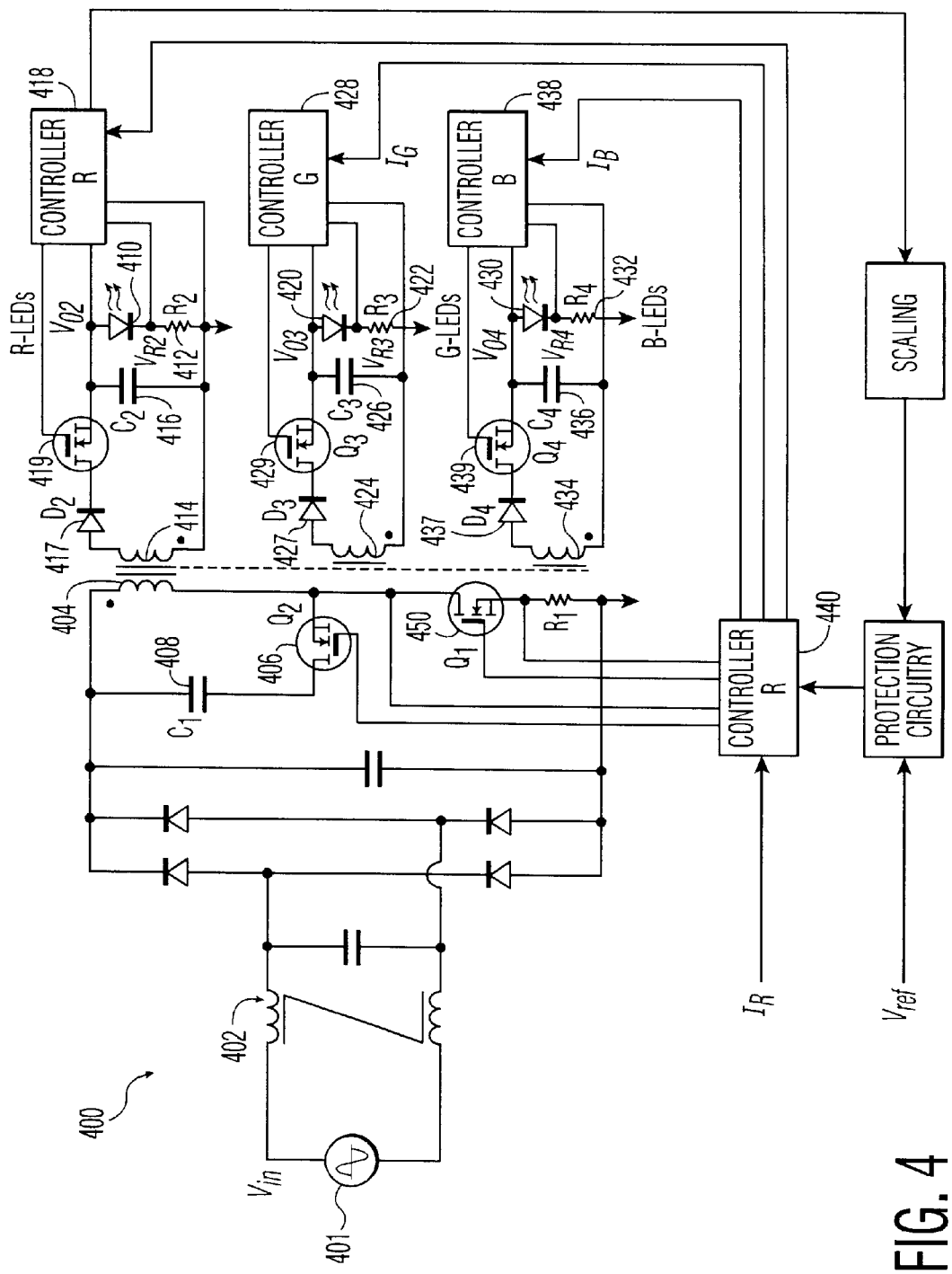
FIG. 4 illustrates an electronic light-emitting-diode array driver circuit, according to another embodiment of the present invention.

Referring now to FIG. 4, the driver circuit of the present invention may also be configured such that the red light-emitting-diode array is also controlled locally. For instance, in the embodiment shown in FIG. 4, a local controller 418 is employed to control the current flow to red light-emitting-diode array in the same manner as controllers 428 and 438 are employed to control the current flow to green and blue light-emitting-diode arrays, respectively. In this embodiment, an additional transistor is coupled to the cathode terminal of diode 417 and to the local controller similar to the manner in which transistors 429 and 439 are coupled to their respective diodes and local controllers. The current signal at resistor 412 is transmitted to the local controller, instead of to main controller 440. Thus, in this embodiment, all of the light-emitting diodes are locally controlled.

Figure 3:
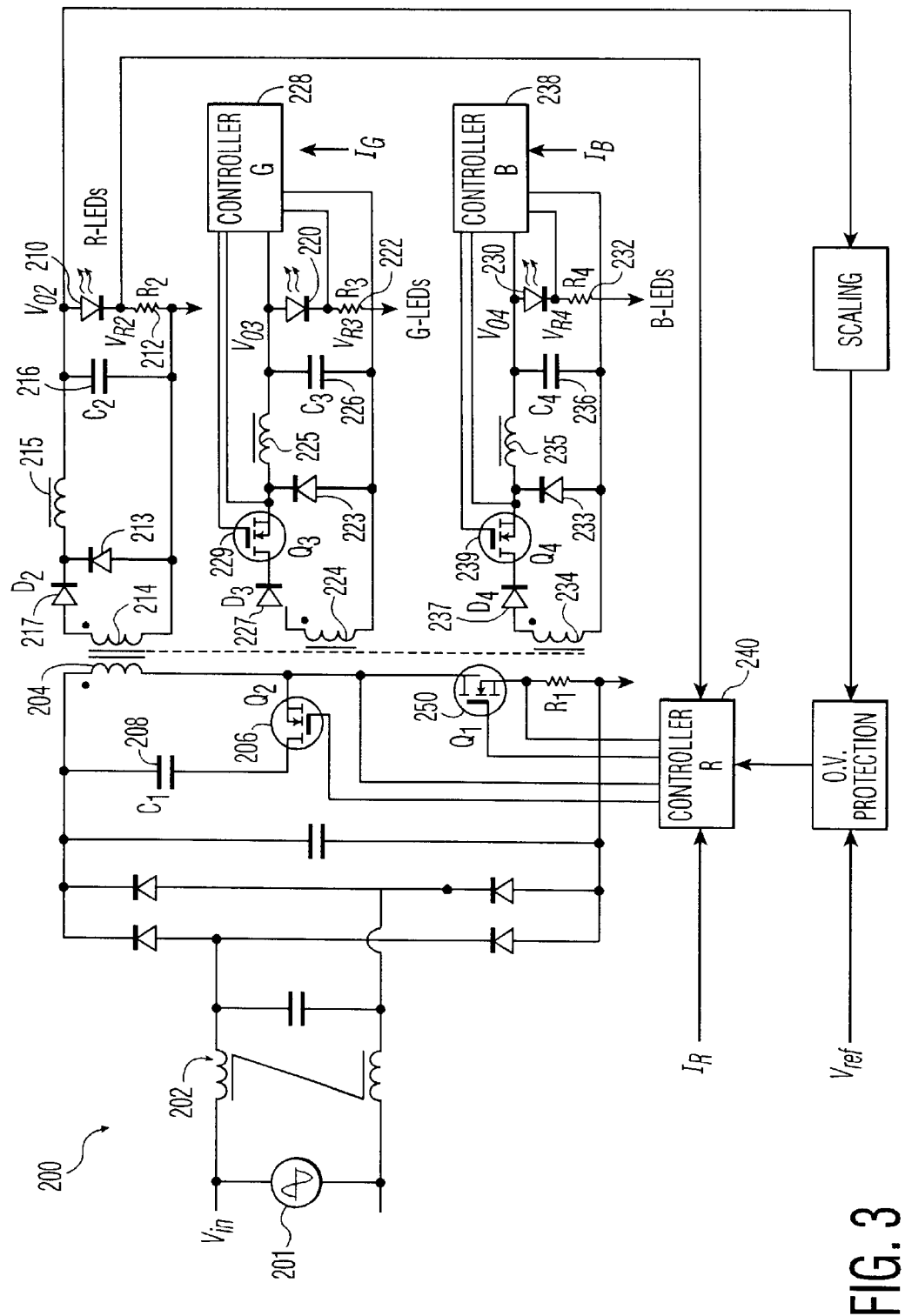
FIG. 3 illustrates an electronic light-emitting-diode array driver circuit, according to another embodiment of the present invention.

FIG. 3 illustrates an electronic light-emitting-diode array driver circuit, according to another embodiment of the present invention. Specifically, FIG. 3 illustrates white light LED driver circuit 200, which employs a multiple output forward converter, as opposed to the flyback converter of driver circuit 100 shown in FIG. 2. Similar to driver circuit 100, light-emitting-diode array driver circuit 200 employs an output current mode control, wherein the light-emitting-diode array output current signal is employed to control the circuit.

As in the previously explained embodiment, voltage supply source 201 provides an input voltage signal, $V_{in}$, which is received as an alternating signal at primary transformer winding 204. Primary transformer winding 204 is wound in the same direction as secondary transformer windings 214, 224 and 234, thus providing the forward, rather than the flyback, converter functionality.

Driver circuit 200 also comprises transistor 206 and capacitor 208. Transistor 206 and capacitor 208 provide an active clamping capability. Secondary transformer winding 214 provides a current signal to red light-emitting-diode array 210, which is coupled to opposite ends of winding 214. Coupled to a first end of secondary transformer winding 214 is diode 217 and transformer winding 215. Coupled in parallel across secondary transformer winding 214, and between diode 217 and transformer winding 215, is diode 213. In addition, coupled in parallel across secondary transformer winding 214, between transformer winding 215 and red light-emitting-diode array 210, is capacitor 216.

The output current signal of red light-emitting-diode array 210 is sensed at resistor 212. Main controller 240 receives the current signal and employs the signal to control the current through circuit 200, and particularly through red light-emitting-diode array 210. Transistor switch 250 is coupled to main controller 240 and also controls the current through red light-emitting-diode array 210.

Secondary transformer winding 224 is also coupled to primary transformer winding 204. Coupled to secondary transformer winding 224 is a green light-emitting-diode array 220. Between secondary transformer winding 224 and capacitor 226 is coupled diode 227, transformer winding 225 and transistor 229. Specifically, secondary transformer winding 224 is coupled to the anode terminal of diode 227 and the cathode terminal of diode 227 is coupled to the drain terminal of transistor 229. Preferably, transistor 229 is an n-channel enhancement type MOSFET transistor. The gate terminal of transistor 229 is coupled to controller 228.

Coupled in parallel across secondary transformer winding 224, between transformer winding 225 and green light-emitting-diode array 220, is capacitor 226. In addition, coupled in parallel across secondary transformer winding 224, and between transistor 229 and transformer winding 225, is diode 223. The current signal through green light-emitting-diode array 220 is sensed at resistor 222. The current signal at resistor 222 is transmitted to controller 228. Between secondary transformer winding 224 and capacitor 226 is coupled diode 227 and transistor 229. By controlling the operation of transistor 229, controller 228 controls the current signal transmitted to green light-emitting-diode array 220.

Secondary transformer winding 234 is also coupled to primary transformer winding 204. Coupled to secondary transformer winding 234 is a blue light-emitting-diode array 230. Between secondary transformer winding 234 and capacitor 236 is coupled diode 237, transformer winding 235 and transistor 239. Specifically, secondary transformer winding 234 is coupled to the anode terminal of diode 237 and the cathode terminal of diode 237 is coupled to the drain terminal of transistor 239. Preferably, transistor 239 is an n-channel enhancement type MOSFET transistor. The gate terminal of transistor 239 is coupled to controller 238.

Coupled in parallel across secondary transformer winding 234, between transformer winding 235 and blue light-emitting-diode array 230, is capacitor 236. In addition, coupled in parallel across secondary transformer winding 234, and between transistor 239 and transformer winding 235, is diode 233. The current signal through blue light-emitting-diode array 230 is sensed at resistor 232. The current signal at resistor 232 is transmitted to controller 238. Between secondary transformer winding 234 and capacitor 236 is coupled diode 237 and transistor 229. By controlling the operation of transistor 229, controller 228 controls the current signal transmitted to blue light-emitting-diode array 220.

As noted in connection with the embodiment of the invention shown in FIG. 2, the embodiment shown in FIG. 3 may also be configured such that main controller 240 is coupled to green light-emitting-diode array 220 or blue light-emitting-diode array 230, instead of red light-emitting-diode array 210. Specifically, according to another embodiment of the invention, driver circuit 200 is configured such that green light-emitting-diode array 220 is coupled to main controller 240 and red and blue light-emitting-diode arrays 210 and 230 are coupled to independent controllers such as controllers 228 and 238. In still another embodiment of the invention, driver circuit 200 is configured such that blue light-emitting-diode array 230 is coupled to main controller 240 and red and green light-emitting-diode arrays 210 and 220 are coupled to independent controllers such as controllers 128 and 138.

Regardless of which of the light-emitting-diode arrays are coupled to main controller 240., the employment of independent controllers such as controllers 228 and 238, which are coupled to the remaining light-emitting-diode arrays, enables the respective output currents of the light-emitting diodes to be independently controlled. This is the case even though there exists some interaction between the output channels.

Figure 5:
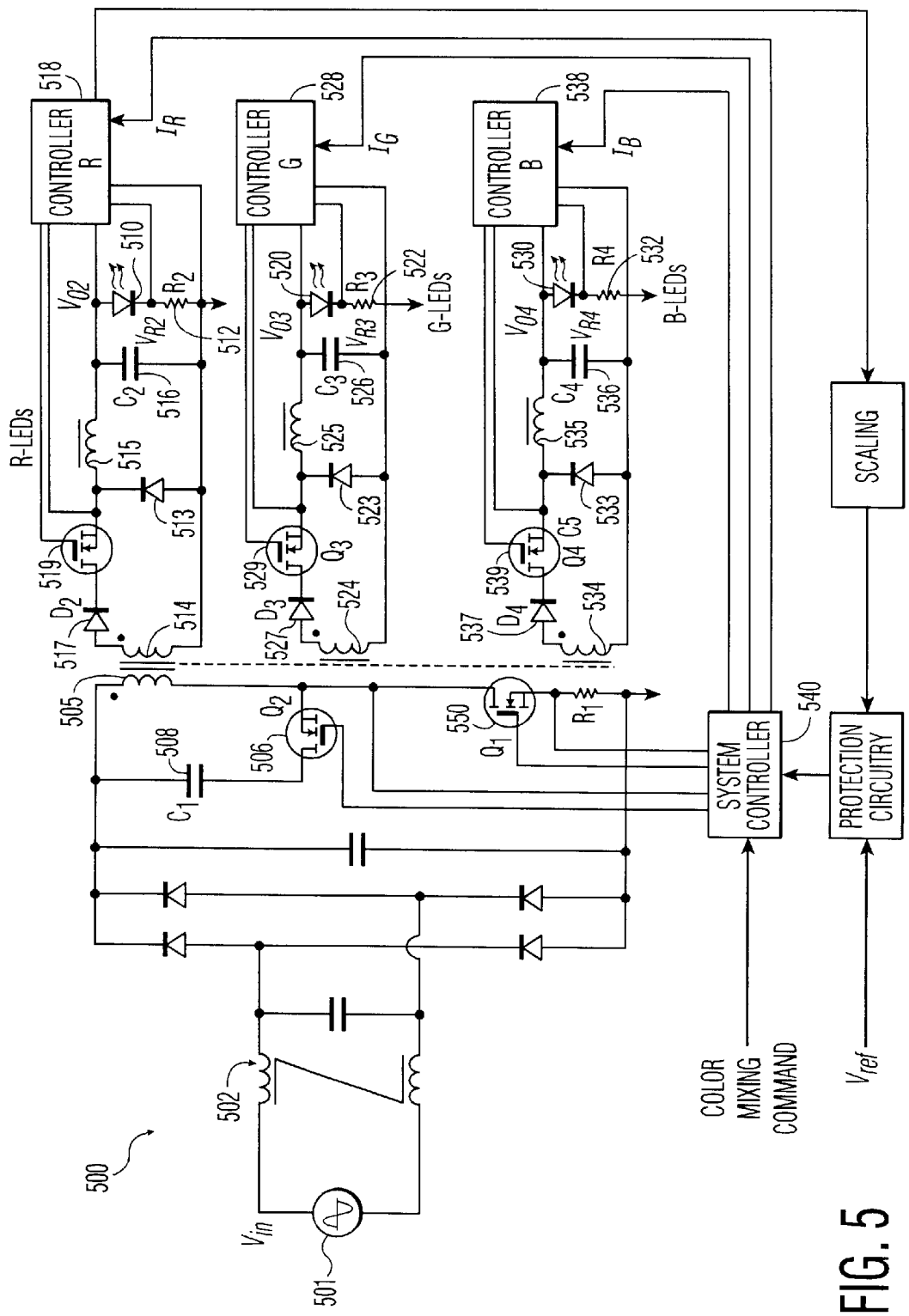
FIG. 5 illustrates an electronic light-emitting-diode array driver circuit, according to another embodiment of the present invention.

Referring now to FIG. 5, the driver circuit of the present invention may also be configured such that the red light-emitting-diode array is also controlled locally. For instance, in the embodiment shown in FIG. 5, local controller 518 is employed to control the current flow to red light-emitting-diode array in the same manner as controllers 528 and 538 are employed to control the current flow to green and blue light-emitting-diode arrays, respectively. In this embodiment, an additional transistor is coupled to the cathode terminal of diode 517 and to the local controller similar to the manner in which transistors 529 and 539 are coupled to their respective diodes and local controllers. The current signal at resistor 512 is transmitted to local controller 518, instead of to main controller 540. Thus, in this embodiment, all of the light-emitting diodes are locally controlled.

As discussed in connection with the flyback converter of FIG. 2, the multiple output forward converter of the present invention has the advantage over the typical light-emitting-diode array driver circuits of the prior art of reducing the redundancy of parts in the circuit. Specifically, whereas the typical light-emitting-diode array driver circuit of the pribr art employs a separate converter for each color of light-emitting-diode array, the circuit of the present invention employs a single converter with multiple outputs, thereby reducing the size and cost of the circuit.

While there has been shown and described particular embodiments of the invention, it will be obvious to those skilled in the art that changes and modifications can be made therein without departing from the invention, and therefore, the appended claims shall be understood to cover all such changes and modifications as fall within the true spirit and scope of the invention.

We claim:

1. A driver circuit comprising:
    a power supply source;
    a transformer having a primary winding coupled to, and configured to receive current from, said power supply, and a plurality of secondary windings coupled to said primary winding;

a plurality of light-emitting-diode arrays, each said light-emitting-diode array coupled to one of said plurality of secondary windings;

a main controller coupled to a first of said light-emitting-diode arrays and configured to control a flow of current to said primary transformer winding;

a plurality of secondary controllers, each of said secondary controllers coupled to a second and third of said plurality of light-emitting diodes, wherein said secondary controllers are configured to control a flow of current to a corresponding light-emitting-diode array.

2. The circuit according to claim 1, wherein each one of said plurality of light-emitting diodes has coupled thereto a resistor.

3. The circuit according to claim 2, wherein an output signal of each said resistor is transmitted to a respective said controller.

4. The circuit according to claim 1, wherein said transformer comprises a flyback converter.

5. The circuit according to claim 4, wherein said flyback converter comprises said primary transformer winding having a direction of said winding opposite to a direction of said secondary transformer windings.

6. The circuit according to claim 1, wherein said transformer comprises a forward converter.

7. The circuit according to claim 6, wherein said forward converter comprises said primary transformer winding having a direction of said winding the same as a direction of said secondary transformer windings.

8. The circuit according to claim 1, wherein said circuit is a white light-emitting-diode array driver circuit.

9. The circuit according to claim 8, wherein said plurality of light-emitting-diode arrays is three.

10. The circuit according to claim 9, wherein said light-emitting-diode arrays are red, green and blue.

11. The circuit according to claim 10, wherein said first light-emitting-diode array is red.

12. The circuit according to claim 10, wherein said first light-emitting-diode array is green.

13. The circuit according to claim 10, wherein said first light-emitting-diode array is blue.

14. A driver circuit comprising:

a power supply source;

a transformer having a primary winding coupled to, and configured to receive current from, said power supply, and a plurality of secondary windings coupled to said primary winding;

a plurality of light-emitting-diode arrays, each said light-emitting-diode array coupled to one of said plurality of secondary windings;

a plurality of secondary controllers, each one of said secondary controllers coupled to a corresponding one of said plurality of light-emitting-diode arrays, wherein said secondary controllers are configured to control a flow of current to said corresponding light-emitting-diode array.

15. The circuit according to claim 14, wherein each one of said plurality of light-emitting diodes has coupled thereto a resistor.

16. The circuit according to claim 15, wherein an output signal of each said resistor is transmitted to said corresponding controller.

17. The circuit according to claim 14, wherein said transformer comprises a flyback converter.

18. The circuit according to claim 17, wherein said flyback converter comprises said primary transformer winding having a direction of said winding opposite to a direction of said secondary transformer windings.

19. The circuit according to claim 14, wherein said transformer comprises a forward converter.

20. The circuit according to claim 19, wherein said forward converter comprises said primary transformer winding having a direction of said winding the same as a direction of said secondary transformer windings.

21. The circuit according to claim 14, wherein said circuit is a white light-emitting-diode array driver circuit.

22. The circuit according to claim 21, wherein said plurality of light-emitting-diode arrays is three.

23. The circuit according to claim 22, wherein said light-emitting-diode arrays are red, green and blue.

24. The circuit according to claim 23, wherein said first light-emitting-diode array is red.

25. The circuit according to claim 23, wherein said first light-emitting-diode array is green.

26. The circuit according to claim 23, wherein said first light-emitting-diode array is blue.

* * * * *